Dec. 29, 1936.  C. W. ABBOTT  2,066,242
CONDUIT CONSTRUCTION
Filed July 14, 1934  2 Sheets-Sheet 1
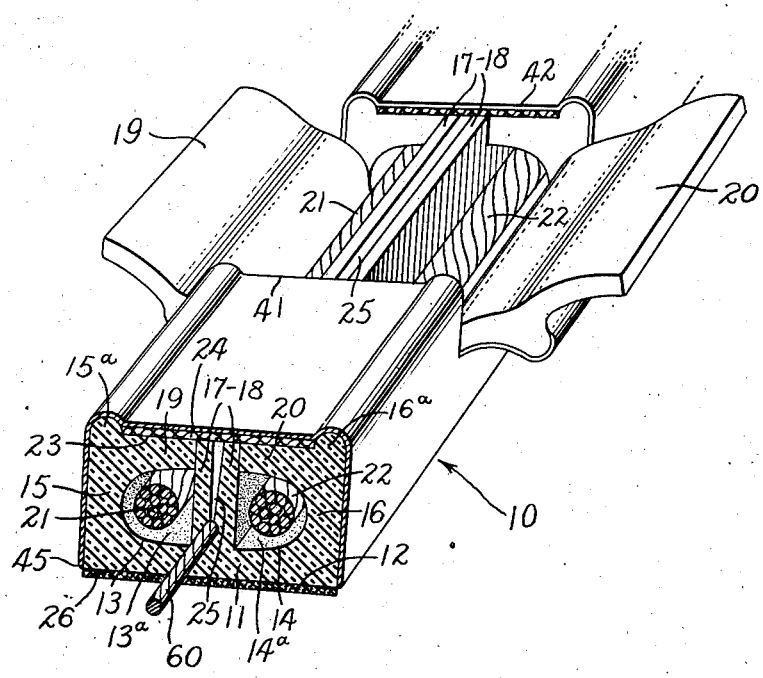
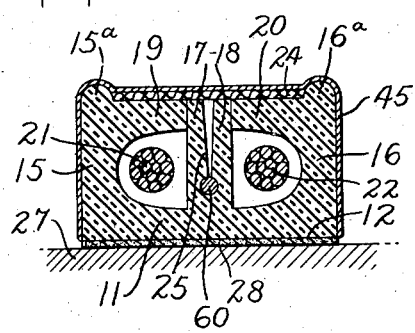
INVENTOR
Charles W. Abbott
BY
ATTORNEYS Dec. 29, 1936.   C. W. ABBOTT   2,066,242
CONDUIT CONSTRUCTION
Filed July 14, 1934   2 Sheets-Sheet 2
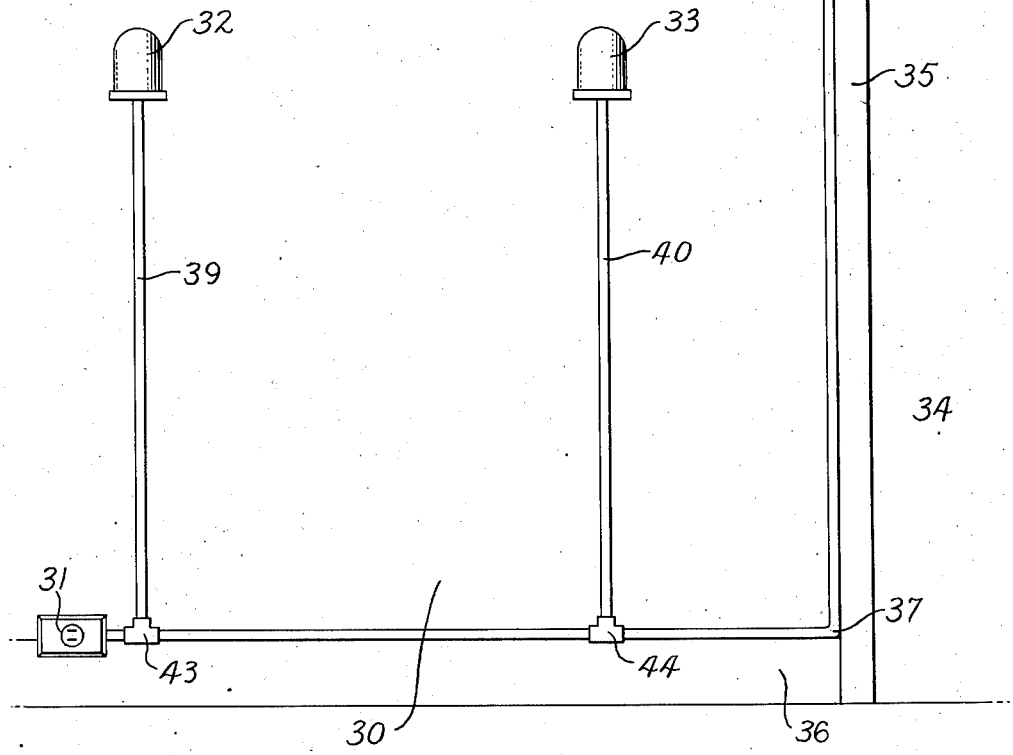
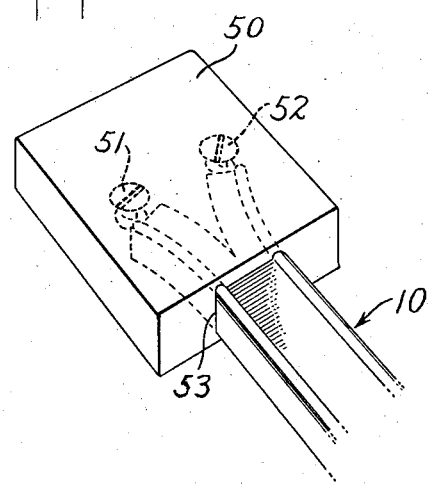
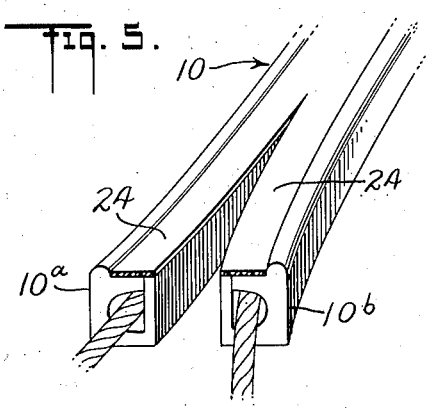
INVENTOR
*Charles W. Abbott*
BY
*Blair, Curtis & Dunne*
ATTORNEYS Patented Dec. 29, 1936

2,066,242

UNITED STATES PATENT OFFICE 2,066,242

CONDUIT CONSTRUCTION

Charles W. Abbott, Larchmont, N. Y., assignor to The Bryant Electric Company, Bridgeport, Conn., a corporation of Connecticut Application July 14, 1934, Serial No. 735,166

11 Claims. (Cl. 247—3)

This invention relates to electric wiring and more particularly to conduit construction.

One of the objects of this invention is to provide an improved conduit construction for carrying the conductor or conductors of electric circuits and one that will be inexpensive, thoroughly dependable in action, and capable of rapid and easy installation in practical use. Another object is to provide a conduit construction of pliant or flexible material, such as rubber, that may be dependably and quickly secured to its supporting wall or surface by an adhesive. Another object is to provide a dependable conduit construction capable of reliably meeting the widely varying conditions met with in practice. Another object is to provide a conduit construction of the above-mentioned nature for insulatingly carrying a plurality of conductors and capable of ready segregation into individual insulated conductors. Another object is to provide a compact, dependable and flexible insulated plural-conductor construction for electrical circuits capable of convenient and ready parting or segregation into individually insulated conductors as, for example, where the latter are to be led to points more widely separated than they are in the plural-conductor structure itself. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is illustratively shown one of various possible embodiments of my invention, Figure 1 is an isometric view showing an insulated plural-conductor structure in the form of a conduit ready for installation and showing also how access to the conductors thereof may be achieved when installed;

Figure 2 is a cross-sectional view of the conduit and the supporting wall or surface to which it is applied, showing how it is installed;

Figure 3 is a perspective view on a small scale of a wall of a room or the like showing a possible form of installation of my conduit;

Figure 4 is a perspective view on a smaller scale showing how the conduit may be related to an electrical fixture or device, and Figure 5 is a perspective view on a smaller scale showing how the conduit is prepared for association with a fixture or device like that of Figure 4.

Similar reference characters refer to similar parts throughout the several views of the drawings.

In so far as certain features and aspects of my invention are concerned, they deal with a conduit construction of the kind disclosed in my Letters Patent Nos. 1,984,355 and 1,984,356, and they aim to provide an improved conduit construction of that kind, to provide a construction capable of better mechanical and electrical action in use, and to provide a construction by which installation may be facilitated and certain practical advantages more dependably achieved.

For carrying out these last-mentioned aims, I prefer to embody my invention in the form of a conduit, generally indicated at 10 in Figure 1, the forward portion, as seen in this figure, being illustrative of the form in which it is made available for installation; its body portion is made preferably of rubber of a kind that, when vulcanized or cured, is pliant or flexible, as set forth in my above-mentioned patents. The conduit 10 has a base portion 11 whose under face 12 is preferably flat and has characteristics presently to be set forth. Upstanding from the base portion 11 is a plurality of longitudinally extending ribs, depending in number upon the number of conductor-receiving channels that it is desired that the conduit 10 shall have. Illustratively, let it be assumed that the conduit 10 is to have two conductor-receiving channels 13—14 and accordingly there are upstanding from the base portion 11 two lateral ribs 15—16 and a central rib structure 17—18, these three ribs being spaced transversely of the base portion 11 and thus laterally bounding the two raceways or conductor-receiving channels 13—14.

The raceways of channels 13—14 are closed by flap-like horizontally directed extensions each integrally formed with a rib and extending toward and into engagement with an adjacent rib; thus side rib 15 has a horizontally extending flap or extension 19 integrally formed therewith extending over the raceway 13 and into engagement with the central rib structure 17—18 and side rib 16 has a horizontally extending flap or extension 20 integrally formed therewith and extending over the raceway 14 to close the latter and into engagement with the rib structure 17—18. These parts are preferably integrally formed with one another.

Within the channels 13—14 of the conduit 10, illustratively two in number as above pointed out, are the conductors 21—22, respectively; these conductors may be of any suitable form but preferably they are bare conductors and stranded, as indicated in Figure 1; also, they are preferably of less cross-section than the cross-section of the closed channels in which they are received, being thereby loosely mounted in the channels and capable of being easily moved lengthwise of their respective channels, where it is desired to achieve the resultant advantages as pointed out in my above-mentioned patents.

Preferably the plane of the upper face of the flap or flaps is coincident with the plane of the upper face of the adjacent rib with which the particular flap contacts and in Figure 1 the upper face of flap 19 will be seen to be alined with the upper face of the portion 17 of the rib structure 17—18 and a similar alinement exists with respect to the upper face of the flap 19 and the upper face of the portion 18 of the rib structure 17—18. Moreover, these four faces form the bottom of a shallow groove 23 which I shall hereafter term a tapeway, the groove 23 being laterally bounded by longitudinally extending upwardly directed ridges 15ª and 16ª, hereinafter termed "external ribs", these portions 15ª and 16ª being integrally formed with the side walls or ribs 15 and 16, respectively.

Into this tapeway 23 is laid a ribbon or tape 24 preferably made of fabric such as cotton, and preferably also relatively loosely woven so as to have an appropriate coefficient of stretch as will later be made clearer. Also, it is preferably selvaged along its longitudinal side edges and it has a width such that it is neatly received between the external ribs 15ª—16ª, thus neatly bottoming in the tapeway 23.

The tape 24 is secured to the alined upper faces of the parts 19, 17, 18 and 20 (Figure 1) and thus holds the channel-closing flaps in closing position. Where the central rib structure 17—18 is two-ply or bifurcated as in the preferred form shown in Figure 1, as because of the narrow and preferably V-shaped slot 25, thus to form a two-ply separating wall or closely adjacent ribs 17 and 18 for carrying out certain other objects in a manner later described herein, the tape 24 thus also bonds the upper ends of the adjacent rib portions 17—18 together and holds them against parting.

The conduit 10 is easily flexed not only about a horizontal axis as viewed in Figure 1 but also about a vertical axis and the top tape 24 is of a character to dependably partake of such flexings of the conduit itself; illustratively, as above already pointed out, the tape 24, where it is of fabric, may be relatively loosely woven or may otherwise be constructed to have substantial yieldability and particularly stretch, thus not only not to unduly restrict the above-mentioned flexings of the conduit itself but also to follow or accompany the distortions of the surface or surfaces to which it is secured and thus to negative any tendency toward relative movement therebetween and consequent shearing of the adhesive that secures the tape 24 to the conduit. The top tape 24 may be secured to the upper surface or surfaces of the conduit in any suitable manner and preferably by any suitable cement or adhesive. Preferably, however, I employ a rubber cement, after first suitably buffing or otherwise preparing the rubber conduit surfaces, which, even after setting, is flexible or yieldable and which will partake of such distortion, such as stretching, as the top tape 24 with the rubber portions of the conduit 10 may be subjected to; various rubber cements having this characteristic are available and suitable for this purpose and illustratively I may employ a cement whose composition is that of pure latex, being substantially pure rubber in milk or latex form.

The under face 12 of the conduit 10 is preferably substantially flat so that, as pointed out in my above-mentioned patents, it may rest against a suitable flat supporting surface, such as a wall or the like, its flexibility adapting itself to whatever irregularities there may be in such supporting surface. Any suitable adhesive may be employed to secure the conduit 10 to the supporting wall. It may be in the nature of glues made of animal substances, a pyroxylin cement, a rubber cement, an adhesive of the colloid type, or the like; in fact, there is a wide range of possible adhesive materials that may be employed.

Accordingly, where such an adhesive is to be employed, I prefer to cover the under face 12 of the base portion 11 by a ribbon or tape-like member 26 (Figure 1). Member 26, illustratively and preferably made of a fabric such as woven cotton and also preferably relatively coarse, is semi-permanently secured to the under face 12 of the conduit 10. In practice, where the conduit structure is made of rubber, base tape 26 is interrelated to the base portion 11 by pressing the two together, conveniently during the process of extrusion, and the coarse weave of the base tape impresses its pattern in the under face 12.

I may also and preferably do apply to the exterior faces of the conduit 10, and preferably excepting the bottom face of the base tape 26, a flexible finish coating, of any desired color, of a suitable material that bonds well with the rubber and yet is flexible or pliant; I may for this purpose employ suitable paint, but preferably I employ a flexible enamel or lacquer.

Preferably, also, this flexible coating does not engage or cover the base tape 26 or its side edges, as shown at 45 in Figure 1, so that when the base tape 26 is subsequently stripped from the base of the conduit, it leaves the coating unimpaired at the lower edges of the lateral ribs 15—16.

In such form, the conduit 10 may be packaged, stored, shipped, or the like, it being noted that the base tape 26, during such or other stages or handling acts not only mechanically to protect the base face 12 and to reinforce and strengthen the conduit structure during handling, but also snugly covers the base face 12, protecting it against dirt, soapstone powder, or other foreign matter, and particularly also protecting the rubber of the face 12 against oxidation.

After the conduit is delivered to the scene of installation, it now having the form shown in Figure 1, the operator strips off the base tape 12, for which reason I have termed the bond between the tape 26 and the rubber base portion 11 a "semi-permanent bond" and thus there is exposed the under face or surface 12 of the base portion 11 which under face, where the conduit 10 is made of rubber presents, due to the prior presence of the base tape 26, a live, virgin, and unoxidized rubber for coaction with a rubber cement to effect a dependable, effective and efficient bond. The irregularities impressed in this under face by the weave of the base tape also in effect increase the area exposed for coaction with the cement or other adhesive. Accordingly, the operator applies a suitable adhesive to this under face 12, places and presses the conduit form against the wall or supporting surface 27 (Figure 2), whereby the layer 28 of adhesive becomes interposed therebetween and upon setting forms a secure and permanent bond.

Considering now certain other features of construction and also certain features of action when the conduit is installed on a wall or the like and in use, it is first to be noted that, as above already stated, the conductor or conductors carried by the conduit are loosely received within their respective channels. The respective conductors, therefore, may be easily moved or pulled along their channels and, moreover, they do not interfere with the bending or flexing of the conduit in either of the above-mentioned planes and thus the pliant rubber conduit readily adapts itself, under the action of the adhesive, to variations from a true plane in the supporting wall or surface to which it is attached and, moreover, the easy relative movement between conductor and conduit, particularly where there are several conductors and channels, permits the construction to adapt itself quickly and easily to relatively sharp turns or bends in the direction in which the conduit is extended along the wall. The conductors, therefore, are prevented from stressing or loading the adhesive.

In Figure 3, to which reference may now be made, is shown a portion of the wall 30 of a room in which, for purposes of illustration, it may be assumed that there is a standard outlet or plug receptacle 31 and that it is desired to extend the circuit to provide energy to wall brackets 32 and 33 and to continue the circuit to some point to the right of a window 34 whose frame is indicated at 35. Accordingly, I may lay the conduit 10, illustratively in the form of that above described, but which, it will now be clear, may, in so far as other features of my invention are concerned, assume other forms such as those described in my Patent No. 1,984,355, along and against the wall 30 just above the baseboard 36, securing it in place by an adhesive as above-described, connecting the conductors of the conduit 10 in any suitable way to the circuit terminating in the plug receptacle or baseboard outlet 31. Running along the baseboard 36, the conduit 10 encounters the window frame 35 but is then given a right angle bend or turn as at 37 whence it is continued alongside of the window frame 35 to the top thereof, whence it is given another right angle turn as at 38 to continue along the top portion of the window frame 35, and on to its ultimate destination, the conductors in the conduit being, of course, anchored or connected at their respective ends to the circuit of the outlet 31, which may be in a standard outlet box, and on the other hand to whatever device the circuit is extended. It is in the making of such turns as indicated in Figure 3 at 37 and 38 that the looseness of the conductors comes into play as was above pointed out. Also, in the making of such turns, the flexibility of the finish coating, preferably of a pliant or flexible paint, enamel, or lacquer, as abovementioned, remains intact, partaking of whatever distortion that the conduit itself is subjected to in making such turns.

To extend the circuit to the sidelights or brackets 32 and 33 suitable lengths 39 and 40 of the conduit 10 are similarly secured to the wall 30, extending from the electrical devices 32 and 33 downwardly along the wall and terminating at the lowermost run of the conduit 10 to the circuit in which their respective conductors are respectively connected.

This inter-connection to the conductors of the conduit 10 (Figure 3) is made first by gaining access to the conductors in a manner better shown in Figure 1 to which reference should now be made. By means of a knife, or the like, two transverse cuts are made in the conduit 10 as is indicated by the lines 41 and 42, the two lines of cutting being spaced suitably, as for example, one or two inches apart and extending downwardly to a sufficient extent to cut through the channel-closing flap of the channel-receiving conductor and, where there are two of the latter, the cuts therefore extend downwardly to a sufficient extent to cut through the flaps 19 and 20 of Figure 1.

The portion of the top tape 24 in between the lines of cutting 41—42 is then stripped off, it being noted that, where it is initially secured by a latex cement, this portion of the tape strips off cleanly, leaving exposed a relatively clean rubber surface of the parts with which it had contacted.

The flaps 19—20 may then be bent into channel-opening position and in this connection the pliancy of the side wall ribs 15—16 may take part, and thus access to the conductors 21—22 is gained.

At this point it is to be noted that, in accordance with other features of my invention, the sides of the circuit or the polarities of the conductors thereof, are at once disclosed. Preferably, the channels themselves are distinguishably colored in any suitable manner as by applying thereto a suitable coating and conveniently and preferably I distinguish the channels by having them contain, and hence having their inside surfaces lined with, soapstone or chalk powder of different colors; thus channel 13 may be colored red as indicated at 13a and channel 14 may be colored white as indicated at 14a. Also, and preferably, I distinguish the conductors themselves and where there are only two conductors and both made of copper, one of them may be tinned and the other left uncoated and hence copper-colored and thus the conductors as well as their respective channels are at all times properly identified. I may, however, also apply a covering, such as cotton covering, to the different conductors, in order by such covering, by which a great variety of distinguishable colors or color schemes are available, to identify and permanently distinguish the different conductors, though it will be understood that in such case I again prefer to maintain the above-described looseness of the conductors (with their cotton or like coverings) with respect to the respective channels in which they are received.

Accordingly, upon gaining access to the circuit or circuits within the conduit 10, as above described, and as is indicated in Figure 1, suitable devices or interconnectors, of the type described, for example, in my Patent No. 1,984,355, may be employed to interconnect the conductors of the conduit runs 39 and 40 (Figure 3) to the lower run of the conduit 10, using the above-described distinguishing marks to maintain consistency of polarity, or the like, where such is required and depending, of course, upon the type of circuit or circuits, the installation, and like factors.

Now, as above set forth, the conductors are preferably of stranded wire in order thereby to achieve certain further features of my invention. For example, where the conductor is stranded its flexibility, coupled with its looseness in its channel in the conduit, makes it easy for the electrician to pull the conductor relative to the conduit, as where it is exposed between the cuts 41—42 in Figure 1, to provide whatever slack may be needed to make the connection thereto at that point or, after the connection has been made, to take up slack at the other end of the conduit or at the next adjacent point of tapping. Such would be the procedure where the entire installation is made at once.

But let it be assumed that the conduit 10 of Figure 3, extending along the baseboard 36 and about the window frame 35 had been initially installed and that at some later time its circuit is desired to be extended, as by the conduit runs 39—40 to the devices 32—33 respectively. In such case, the length of the conductor or conductors in the existing run of conduit 10 would be substantially fixed, having been determined by the then existing needs. In such case, however, the tapping of the circuit and the connecting of the extension conduits 39—40 to the conductors of the lower run of conduit 10, without cutting the latter conductors, could still be dependably effected because, due to the stranded character of the conductors and the resultant successively recurring helical convolutions of the individual strands thereof, the conductor as a whole has a substantial factor of stretch and accordingly makes available, through the exposed conduit interval between the cuts 41—42 (Figure 1), sufficient slack, out of such capacity of the conductors to stretch, so that the connection may be effectively made.

Should it be desired at any time to discontinue or remove the extension runs 39—40 of Figure 3 or either of them, the connecting devices used to interconnect their respective conductors with the conductors in the lower run of conduit 10 (Figure 3) are removed as are also the extension conduits themselves, and thus at the points 43 and 44 (Figure 3) the lower run of conduit 10 would appear much as is shown in Figure 1, but with some slack in the conductors exposed through the interval between cuts 41—42. However, the conductor is simply pushed back down into its channel and, because of the looseness of the conductor relative to its channel, the latter easily and readily accommodates the slack.

Thereupon, the flap is restored to channel-closing position, each flap being brought back into engagement with a rib portion of the conduit and all of the flaps are then secured in channel-closing position by means of a strip of tape somewhat longer than the interval between the lines of cutting 41—42 so as to overlap the latter. The tape is fitted into the top tapeway 23, between the bounding external ribs 15ª—16ª; it may be of any suitable form of adhesive tape, or it may be a strip of linen or cotton tape cemented in place by any suitable adhesive. Thus, the dielectric is fully restored.

Under certain circumstances of installation or use of the insulated conductor structure, it is advantageous that the conduit be easily segregated or separated into individual subconduits containing each one or more of the conductors of the conduit itself, and in carrying out this aim of my invention, the conduit will be seen to comprise, in effect, a multi-tubular flexible rubber structure in the adjacent tube-like parts or bores of which are contained and encased and insulated from each other the flexible conductors, illustratively the two conductors 21—22 of Figure 1, the latter being separated and insulated from each other by a wall, comprising the two rib portions 17—18, which is thus in two layers or in two plies of rubber. To illustrate with the preferred form shown in Figure 1 and assuming as above that the it contains two conductor channels with the conductors therein, it may be necessary to run the conductors appropriately insulated to points, usually points of connection, that are spaced apart by a distance greater than the spacing between the conductors in the conduit or insulating structure itself. For example, and turning now to Figure 4, let it be assumed that the part generally indicated at 50 is any electrical device which has to be electrically energized and which, illustratively, has two binding posts 51 and 52 to which the conductors 21 and 22, respectively (Figure 1) of the conduit 10 are to be connected and that the spacing between the binding posts 51—52 (Figure 4) is greater than the spacing between the conductor-receiving channels 14—15 (Figure 1). Accordingly, the conduit 10 may be run into the device 50 through a suitable opening 53 in a side wall thereof, preferably shaped to correspond to the cross-section of the conduit 10, both conduit 10 and the device 50 being, for present illustrative purposes, assumed to be secured to a wall or the like, whereupon the conduit 10 is parted or severed throughout a sufficient distance from its left-hand end as viewed in Figure 4. To part or subdivide the conduit, a knife may be moved longitudinally along the narrow slot 25 (Figure 1), or the parts of the conduit to either side of slot 25 may be simply ripped apart. In either case, the portions or parts that otherwise hold the two layers or plies 17—18 against separation, these parts being, in the illustrative construction, the top tape 24 and the unslotted portion of the base 11, give way and the multi-tubular structure becomes parted, along the plane or line of cleavage between the parts 17—18, into individual tube-like parts, as shown at 10ª and 10ᵇ in Figure 5, each completely encasing and insulating a conductor. Once the parting is started, the divided portions of the conduit may be made of any desired length, depending upon the extent throughout which the portions are pulled or torn or cut apart. The remaining or unparted portions of the top tape 24 respectively hold the channel-closing flap securely to the rib portion 17 or the rib portion 18, as the case may be, thus maintaining dependable insulation for the individual conductors.

In Figure 5 is shown the end portion of the conduit 10 of Figure 4, as it is thus severed and it will be seen that there are thus provided two subconduits 10ª and 10ᵇ, each containing in its closed channel its respective conductor, dependably encased and dependably insulated. Thus, individual conductors of the conductor construction may be insulatingly segregated from each other and easily and insulatingly run to whatever points of connection they are intended for, even though such points may be widely or substantially separated from each other.

Recurring now to Figure 1, it may first be pointed out that under certain circumstances, depending upon the type or kind of circuit in which the conduit is used, it may be necessary to provide in the circuit arrangement a special or auxiliary conductor that may serve as a ground wire, as a special signal circuit wire, or the like. In such case, I utilize the narrow slot 25 to accommodate such an auxiliary conductor, the latter indicated at 60 in Figure 1, being bottomed in the slot 50 and also being preferably bare. Conductor 60 also may be a stranded conductor.

With the auxiliary conductor 60 bottomed in the slit 25 which defines the line of cleavage between the rib portions 17 and 18, the auxiliary conductor 60, when circuit or wiring conditions require its presence, is run wherever the conduit 10 is laid down, and it will be seen that the remaining conductors in the conduit are dependably insulated therein, as by the intervening rib portions 17 or 18 as the case may be, while the conductor 60 is held in its slit 25, being gripped, as it were, by the rib portions 17—18 which are held together at their upper ends by the top tape 24. Where access to the conductor 60 at a point intermediate of the ends of the conduit 10 is necessary, and generally such access thereto would be necessary at the same point where access to one or more of the main conductors of the conduit has to be gained, it will be noted that, still referring to Figure 1, the procedure whereby one or more of the channel-closing flaps is bent open, as between the lines of cutting 41—42, also makes the auxiliary conductor 60 available. The removal of the section of the top tape 24 exposes the upper portion of the slit 25 and by bending the rib portions 17—18 apart from each other, access to the conductor 60 may be gained. Restoration of the insulation as was above described, also restores the conduit to its initial condition with respect to conductor 60, as will now be clear.

It will thus be seen that there has been provided in this invention an insulated conductor construction in which the various objects hereinbefore set forth together with many thoroughly practical advantages are successfully achieved. It will be seen that the construction is of a thoroughly practical nature, readily adapts itself to the many varying conditions of practical use, is of great convenience in installation and may be quickly and inexpensively installed. Moreover, it will be seen that as a conduit it may be installed on existing finished room surfaces where its appearance is anything but unsightly and where it may partake of the decorative molding scheme; it, moreover, may be embodied in relatively diminutive form even when employed in power or lighting circuits of standard voltages and illustratively of this feature it might be noted that, referring now to Figure 1, the conduit may be made to scale according to that figure with the width of the base portion 11, where the conduit is to have two conductor-receiving channels as there illustrated, substantially seven-sixteenths of an inch. Moreover, it will be seen that the construction lends itself readily to dependably meet the widely varying conditions of practical use.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:—

1. In conduit construction, in combination, a conduit made up of a semi-rigid and relatively flexible dielectric material and having a base portion adapted to rest against a wall or the like, said conduit having a substantially centrally positioned longitudinally extending upstanding bifurcated rib-like portion and at least two longitudinally extending upstanding side wall portions each laterally spaced from said central bifurcated rib-like portion to form therebetween at least two conductor-receiving channels, said channels being open throughout their length along said conduit, the outermost of said side wall portions having extensions bridging over the otherwise open channels and extending into engagement with one of the bifurcations of said central rib portion, thereby to close said channels, said side wall portions having upwardly directed external rib-like portions forming therebetween a tapeway, and a tape extending lengthwise of and accommodated in said tape-way for securing said first-mentioned extensions in channel-closing position and for holding the bifurcations of said central rib portion against separation.

2. In conduit construction, in combination, a conduit made up of a semi-rigid and relatively flexible dielectric material and having a base portion adapted to rest against a wall or the like, said conduit having a substantially centrally positioned longitudinally extending upstanding bifurcated rib-like portion and at least two longitudinally extending upstanding side wall portions each laterally spaced from said central bifurcated rib-like portion to form therebetween at least two conductor-receiving channels, said channels being open throughout their length along said conduit, the outermost of said side wall portions having extensions bridging over the otherwise open channels and each extending into engagement with one of the bifurcations of said central rib portion, thereby to close said channels, a conductor extending along and received between the bifurcations of said central rib portion, said side wall portions having upwardly directed external rib-like portions forming therebetween a tapeway, and a tape extending lengthwise of and accommodated in said tapeway for securing said first-mentioned extensions in channel-closing position and for holding the bifurcations of said central rib portion against separation, and for thereby holding said conductor between said bifurcations.

3. In conduit construction, in combination, a rubber conduit having a base portion and a plurality of longitudinally extending but laterally spaced upstanding rib-like portions forming channels therebetween, certain of said rib-like portions having flap-like extensions extending respectively toward an adjacent rib-like portion and engaging the latter at a side face thereof to substantially close over the channel therebetween and with the upper face of each flap-like extension and the upper face of its adjacent rib-like portion exposed and substantially in alinement, and relatively easily removable means engaging said alined and otherwise exposed faces of both flap-like extension and rib-like portion for releasably holding said engaged parts in channel-closing position.

4. In conduit construction, in combination, a rubber conduit having a base portion and a plurality of longitudinally extending but laterally spaced upstanding rib-like portions forming channels therebetween, the outermost of said rib-like portions having flap-like extensions extending toward an inner rib-like portion to substantially close over said channels and each of said outermost rib-like portions having a longitudinally extending and upwardly projecting ridge to form a tapeway therebetween, and a ribbon-like material accommodated in said tapeway and secured to said conduit by an adhesive for holding said flap-like extensions in channel-closing position.

5. In conduit construction, in combination, a conduit made up of a semi-rigid and relatively flexible dielectric material and having a flat base portion adapted to rest against a wall or the like and having at least two longitudinally extending but laterally spaced understanding rib-like portions to form a conductor-receiving channel therebetween, one of said rib-like portions having a flap-like extension extending over said channel toward a side face of the other of said rib-like portions, thereby to bridge over and close said channel, and with the upper face of said flap-like extension and the upper face of said other rib-like portion exposed upwardly and substantially alined, and sheetlike material secured to both said upwardly exposed faces for holding said two parts against separation, whereby a conductor laid in said channel is on all sides enclosed and insulated.

6. In conduit construction, in combination, a conduit made of a semi-rigid dielectric material and having a base portion adapted to rest against a wall or the like and outer portions spaced from said base portion by a plurality of longitudinally extending but laterally spaced parts, whereby there is formed a plurality of longitudinally extending but laterally spaced and completely enclosed channels, and conductors lying loosely in said closed channels, the cross-sectional area of the channels being greater than the cross-section of the conductors therein, at least one of said laterally spaced parts having a slit extending therealong, and a conductor accommodated in said slit and insulated by the two wall portions of said slit but to either side of the slit.

7. In conduit construction, in combination, a conduit made up of a semi-rigid and relatively flexible dielectric material and having a base portion with a plurality of longitudinally extending and laterally spaced upstanding rib-like portions to form therebetween a plurality of conductor-containing channels and means of dielectric material forming a closure juxtaposed to the bottoms of said channels for closing the latter and for thereby encasing the conductors therein, said conduit having a slit extending longitudinally thereof and in a plane substantially coincident with the central plane of an intermediate rib-like portion, thereby partially severing said conduit along its length.

8. In construction of the character described, in combination, elongated insulating means of flexible rubber having extending therealong and therein at least two entirely enclosed channels, with a conductor in each, the channel-forming rubber portions being secured together against relative longitudinal movement and the channels thereof being separated by a two-ply rubber insulating wall, whereby said elongated insulating means may be readily parted into at least two longitudinally extending parts each of which embodies one of said completely enclosed channels and the conductor therein.

9. An insulated multiple conductor structure comprising, in combination, a multi-tubular structure of flexible insulating material for encasing and insulating from each other a plurality of conductors, and flexible conductors each within and encased by one of the bores of said structure, the wall portion of the latter separating any two conductors therein and that joins together adjacent tube-like conductor-carrying members of said structure having a slit extending longitudinally thereof, thereby to weaken said wall and to facilitate separating said structure substantially along the plane of said slit into a plurality of tube-like insulated conductor-carrying members.

10. An insulated multiple conductor structure comprising, in combination, a double-tubular structure of flexible rubber for encasing and insulating from each other two flexible conductors, a flexible conductor extending lengthwise within each bore of said tubular structure and encased and insulated thereby, the rubber wall that intervenes the two conductors being in at least two layers which are integral along at least one longitudinal margin thereof and hence being joined together along an exterior face of said structure, whereby one tube-like conductor-encasing part of said structure may be torn or parted from the other.

11. An insulated multiple conductor structure comprising, in combination, a multi-tubular structure of flexible rubber for encasing and insulating from each other a plurality of conductors, flexible conductors each within and encased by one of the bores of said structure, adjacent bores and hence the conductors therein being separated and insulated from each other by a substantially two-ply rubber insulating wall, and means securing the two plies of said separating wall together, and against relative longitudinal movement, with a strength capable of being overcome upon pulling one tube-like conductor-encasing part of said structure away from the adjacent one and thereby to separate said structure, substantially along the plane between said two plies, into a plurality of tube-like insulated conductor-carrying members.

CHARLES W. ABBOTT.